(12) United States Patent
Kim (10) Patent No.: US 12,372,857 B2
(45) Date of Patent: Jul. 29, 2025

(54) MOBILE PHONE FIXING STAND FOR SELFIES

(71) Applicant: Min Soo Kim, Busan (KR)

(72) Inventor: Min Soo Kim, Busan (KR)

( * ) Notice: Subject to any disclaimer, the term of this patent is extended or adjusted under 35 U.S.C. 154(b) by 543 days.

(21) Appl. No.: 17/801,137

(22) PCT Filed: Dec. 21, 2020

(86) PCT No.: PCT/KR2020/018752
§ 371 (c)(1),
(2) Date: Aug. 19, 2022

(87) PCT Pub. No.: WO2021/167226
PCT Pub. Date: Aug. 26, 2021

(65) Prior Publication Data
US 2023/0072993 A1 Mar. 9, 2023

(30) Foreign Application Priority Data

Feb. 19, 2020 (KR) .......... 10-2020-0020636
Jun. 25, 2020 (KR) .......... 10-2020-0078078

(51) Int. Cl.
*G03B 17/56* (2021.01)
*H04M 1/04* (2006.01)

(52) U.S. Cl.
CPC ............ *G03B 17/561* (2013.01); *H04M 1/04* (2013.01)

(58) Field of Classification Search
CPC .................. G03B 1/561; H04M 1/04
See application file for complete search history.

(56) References Cited

U.S. PATENT DOCUMENTS

| 7,534,056 | B2 * | 5/2009 | Cross | ............... F16M 13/02 70/2 |
| 9,379,759 | B2 * | 6/2016 | Platt | ............... H04B 1/3888 |

(Continued)

FOREIGN PATENT DOCUMENTS

| CN | 21106347 | * | 7/2020 | ............ H04M 1/04 |
| DE | 10018275 | * | 6/2003 | ............ A45F 5/102 |

(Continued)

OTHER PUBLICATIONS

KR Office Action dated Aug. 4, 2020 as received in Application No. 10-2020-0078078.

(Continued)

*Primary Examiner* — Steven S Kelley
(74) *Attorney, Agent, or Firm* — Maschoff Brennan (57) ABSTRACT

The present invention relates to a mobile phone fixing stand for selfies, the mobile phone fixing sand comprising: a body (10) having a spiral spring mounted therein; a head (20) connected to the front surface of the body (10) by a ball joint; a fixing band (40) which is connected to the spiral spring and can be inserted into and withdrawn from the inside of the body (10) via the side surface of the body (10); an upper fixing band (40-1) which has one end fixed to the upper side of the front surface of the body (10) and another end connected to an end portion of the fixing band (40); and a lower fixing band (40-2) which has one end fixed to the lower side of the front surface of the body (10) and another end connected to the end portion of the fixing band (40). The upper fixing band (40-1) and the lower fixing band (40-2) pull and support the upper side and the lower side of the body (10), respectively, thereby fixing the body (10) to a structure.

4 Claims, 7 Drawing Sheets

(56) References Cited

U.S. PATENT DOCUMENTS

| | | | | |
|---|---|---|---|---|
| 2004/0200868 | A1* | 10/2004 | Woodman | A45C 11/38 |
| | | | | 224/221 |
| 2015/0195392 | A1* | 7/2015 | Nissenbaum | A45F 5/00 |
| | | | | 455/569.1 |
| 2016/0014243 | A1* | 1/2016 | Snowden | H04M 1/04 |
| | | | | 455/575.1 |
| 2016/0209733 | A1* | 7/2016 | Akai | F16M 11/041 |
| 2017/0163860 | A1* | 6/2017 | Frank | F16M 13/04 |
| 2018/0056888 | A1 | 3/2018 | Wang | |
| 2019/0128469 | A1* | 5/2019 | Lu | F16M 11/242 |
| 2019/0227414 | A1* | 7/2019 | Umphries | A01M 31/002 |
| 2019/0357661 | A1* | 11/2019 | Walters, Jr. | A45F 5/00 |
| 2020/0292919 | A1* | 9/2020 | Goodman | H04N 23/54 |
| 2022/0060208 | A1* | 2/2022 | Wang | H04M 1/04 |
| 2024/0308436 | A1* | 9/2024 | Yao | F16M 11/041 |

FOREIGN PATENT DOCUMENTS

| | | | | |
|---|---|---|---|---|
| JP | 2015-155937 | A | 8/2015 | |
| KR | 10-1020571 | B1 | 3/2011 | |
| KR | 20-0481747 | | 11/2016 | |
| KR | 20-2017-0004267 | | 12/2017 | |
| KR | 10-2018-0005417 | A | 1/2018 | |
| KR | 10-2018-0097207 | A | 8/2018 | |
| KR | 10-1983729 | B1 | 5/2019 | |
| KR | 10-2182452 | B1 | 11/2020 | |
| KR | 20210001648 | * | 7/2021 | G03B 17/561 |
| KR | 2021-0001801 | * | 8/2021 | H01F 7/02 |

OTHER PUBLICATIONS

KR Decision to Grant Dated Nov. 17, 2020 as received in Application No. 10-2020-0078078.

* cited by examiner

MOBILE PHONE FIXING STAND FOR SELFIES

TECHNICAL FIELD

The present invention relates to a mobile phone fixing stand, and more specifically, to a mobile phone fixing stand that is capable of easily fixing a mobile phone to a structure such as a wall body, a post, and the like so as to take a selfie.

BACKGROUND ART

As a smartphone camera's quality has been recently improved, the performance and functions of the smartphone camera are enhanced similarly to those of a digital camera, and accordingly, taking a photo is usually performed only through the smartphone, without any separate camera, during travelling or in a daily life, so that the photo is kept in the smartphone, or just after taking a photo, the photo is uploaded to various types of SNS.

Figure 9:
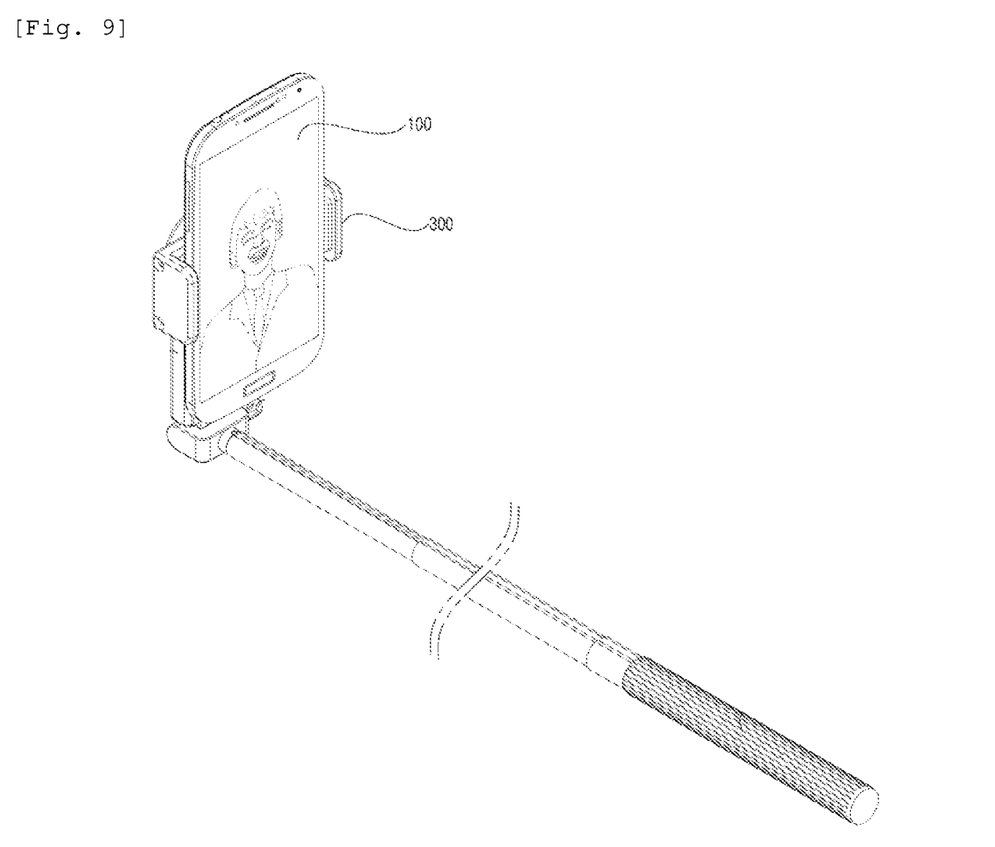
FIG. 9 is a perspective view showing a conventional selfie stick.

However, it is hard to take a selfie or a group photo through the smartphone, without any help of the others. Accordingly, as shown in FIG. 9, a selfie stick (a selfie stick for mounting a mobile phone), which is multi-staged to be fully expandable and foldable, is developed and popular all over the world, so that a selfie can be taken, without any help of others. In this case, the multi-staged selfie stick can be advantageously folded to a small volume, but it is very uncomfortable to carry the selfie stick even small in volume. Besides, even though the selfie stick is fully expandable, it may be limited to the length. If a user's arm is stretched to hold the fully extending selfie stick on which the mobile phone is fixedly mounted, further, his or her arm may shake because of the weight of the mobile phone, thereby undesirably taking a shaky selfie.

To solve such a problem, a tripod for a selfie stick is disclosed in Korean Utility Model Registration No. 20-0481747 (See FIG. 10), which is coupled to the selfie stick to stand the selfie stick on the ground. In this case, clear photos can be taken because the mobile phone does not shake, but unfortunately, the photos cannot be taken at various angles. That is, only the bottom-up photos can be taken, and the tripod may fall down because it stands on the ground, thereby undesirably causing the mobile phone to be damaged or broken.

DISCLOSURE

Technical Problem

Accordingly, the present invention has been made in view of the above-mentioned problems occurring in the related art, and it is an object of the present invention to provide a mobile phone fixing stand that is capable of allowing a mobile phone to be simply attached to a steel plate or post or stably fixed to an object such as a tree trunk, and the like, so that a selfie can be taken at various angles conveniently.

Technical Solution

To accomplish the above-mentioned objects, according to the present invention, there is provided a mobile phone fixing stand for a selfie, including: a body (10) having a spiral spring mounted therein; a head (20) connected to the front surface of the body (10) by a ball joint and freely rotatable with respect to the body (10); a mobile phone attachment plate (21) disposed on the head (20) and made of a magnet to which a mobile phone is fixedly attached; a fixing band (40) with a given width connected to the spiral spring, inserted into and drawn from the inside of the body (10) on a given side surface of the body (10), and made of an elastic material; an upper fixing band (40-1) with a given width fixed to the upper side of the front surface of the body (10) on one end thereof and connected to an end portion of the fixing band (40) on another end thereof; and a lower fixing band (40-2) with a given width fixed to the lower side of the front surface of the body (10) on one end thereof and connected to the end portion of the fixing band (40) on another end thereof, wherein if an arbitrary portion of the fixing band (40) is pulled and fixedly wound around a structure to which the body (10) is fixed, the upper fixing band (40-1) and the lower fixing band (40-2) supportingly pull the upper side and the lower side of the body (10), respectively, so that the body (10) is fixed to the structure.

In this case, the body (10) may include a magnet(s) (31) disposed along the edge periphery thereof on the region excepting the central portion thereof, the magnets (31) being disposed in parallel with one another along the edge periphery of the body (10), or the magnet (31) having the shape of a ring concentric with the edge periphery of the body (10) being disposed along the edge periphery of the body (10).

Further, the body (10) may include a hanger (11) disposed on the opposite side to the portion where the fixing band (40) is inserted and drawn so as to fastenedly hang the fixing band (40) thereon, the hanger (11) being protruding from the body (10) to hang the fixing band (40) thereon or having the shape of a slot type concave groove, and the fixing band (40) has a fastener (41) having the shape of a long bar and mounted freely movable on the end portion of the fixing band (40), so that the fastener (41) is insertedly mounted into the hanger (11) having the shape of the slot type concave groove.

In addition, the mobile phone attachment plate (21) may include a gripping member mounted thereon to fixedly hold opposite ends of the mobile phone.

Further, the body (10) may include a brake (12) disposed on one side thereof, and the brake (12) operates, if necessary, to fix the fixing band (40) thereto, without any movement of the fixing band (40), even under the application of the elastic force generated from the spiral spring to the fixing band (40).

Advantageous Effects

According to the present invention, the mobile phone fixing stand for a selfie can be simply attached to a steel plate or post by means of the magnet attached to the underside of the body or fixedly tied with a tree or given structure by means of the fixing band freely extending in length, so that the selfie can be easily taken, without the help of the user's arm.

Further, the mobile phone fixing stand of the present invention can stably support the mobile phone against the structure, irrespective of the size and weight of the mobile phone.

Additionally, the mobile phone fixing stand of the present invention can be fixedly attached to all kinds of structures, irrespective of the heights of the structures, so that the selfie can be taken at various angles, without having any relation with a distance between the mobile phone and a subject.

BEST MODE FOR INVENTION

Hereinafter, example embodiments will be described with reference to the accompanying drawings. In the description, the detailed explanation of the technology having no direct relation with the technical characteristic of the present invention, the technology obvious to a person skilled in the art, and the technology repeatedly applied to the embodiments of the present invention will be avoided.

Further, the terminology used herein is defined in consideration of the functions in the present invention and varied in accordance with a user or operator's intention or rules. Accordingly, the definition of the terminology has to be given on the basis of the description of the present invention.

Figure 1:
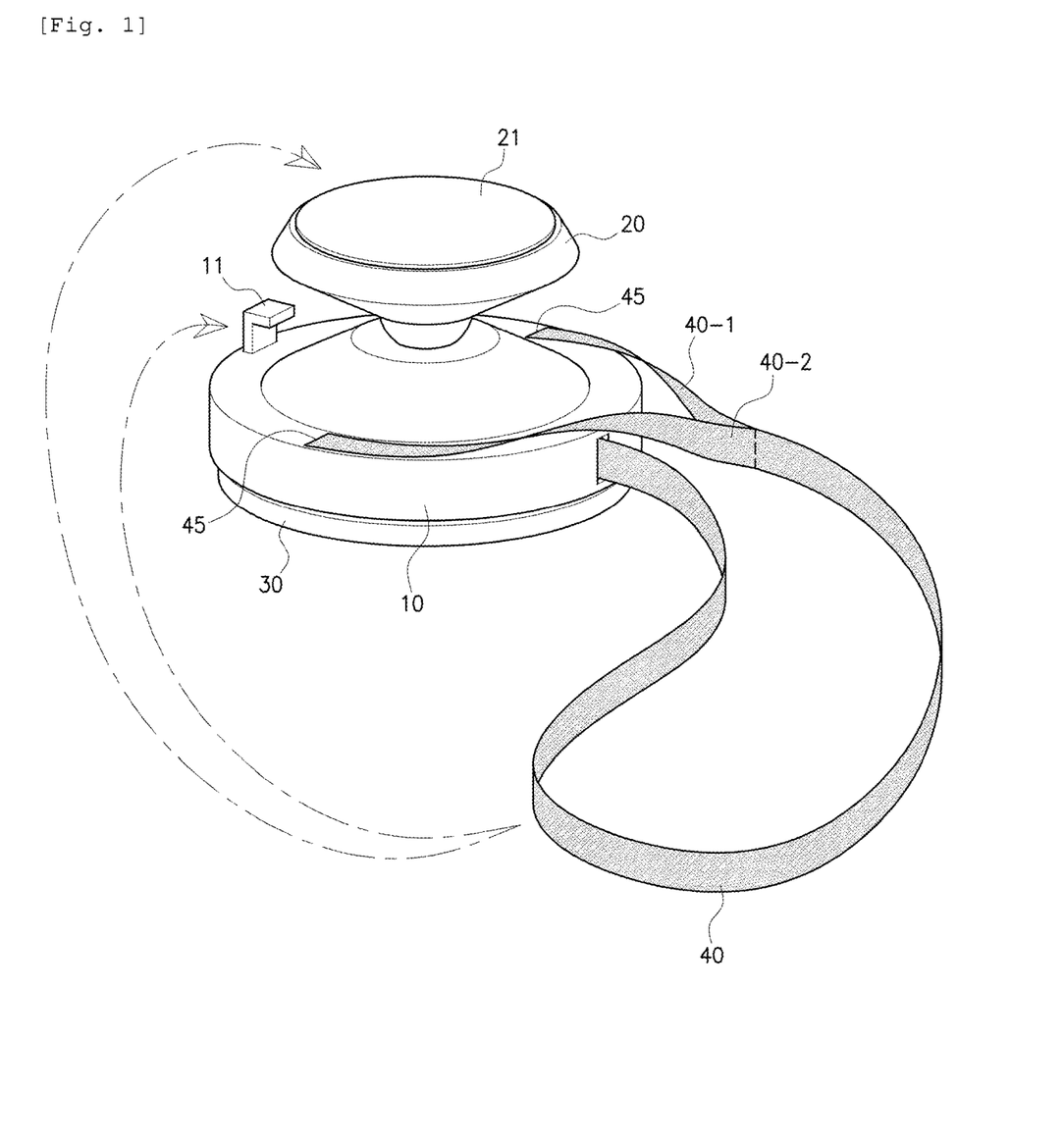
FIG. 1 is a perspective view showing a mobile phone fixing stand according to an embodiment of the present invention.
Figure 2:
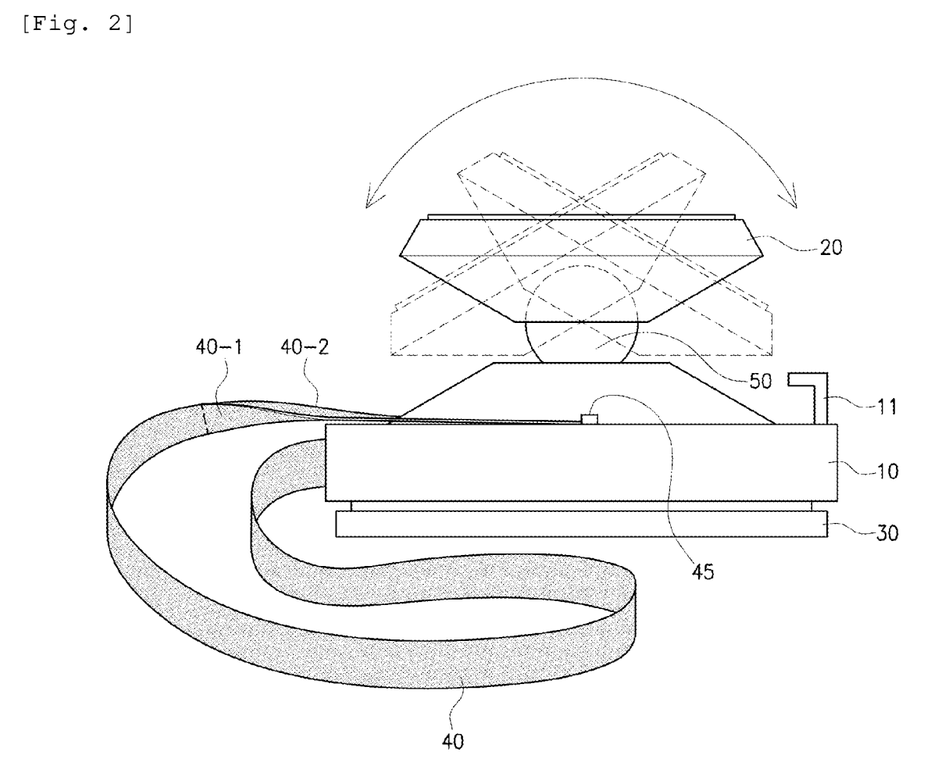
FIG. 2 is a side view showing the mobile phone fixing stand according to the present invention.
Figure 3:
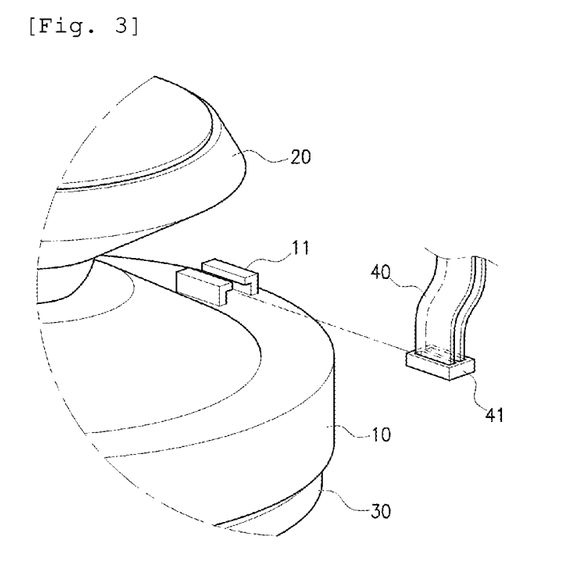
FIG. 3 is a perspective view showing a mobile phone fixing stand according to another embodiment of the present invention.
Figure 4:
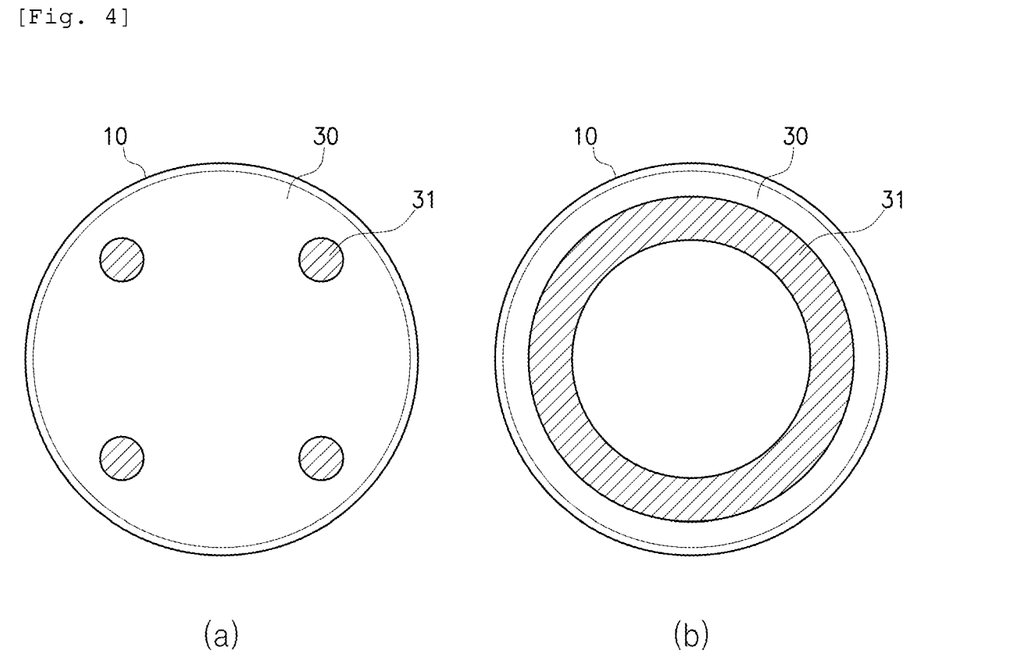
FIGS. 4a and 4b are top views showing a magnet(s) of the mobile phone fixing stand according to the present invention.
Figure 5:
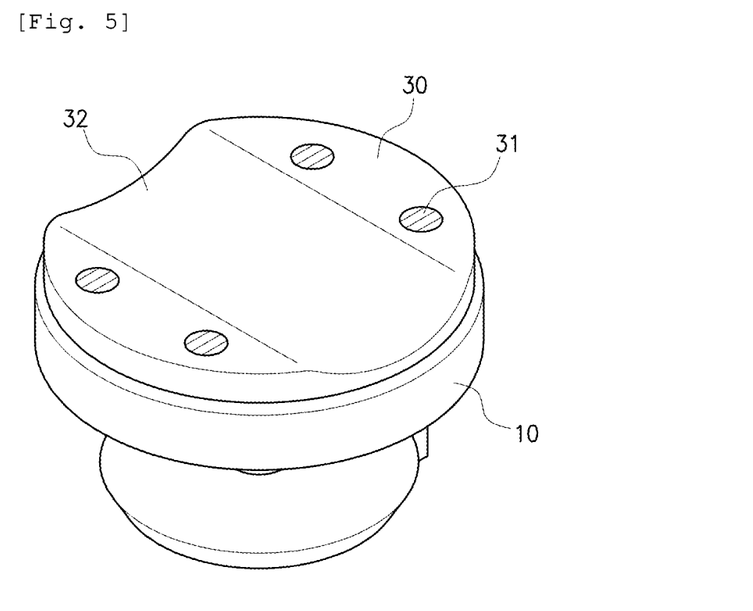
FIG. 5 is a perspective view showing a groove of the mobile phone fixing stand according to the present invention.
Figure 6:
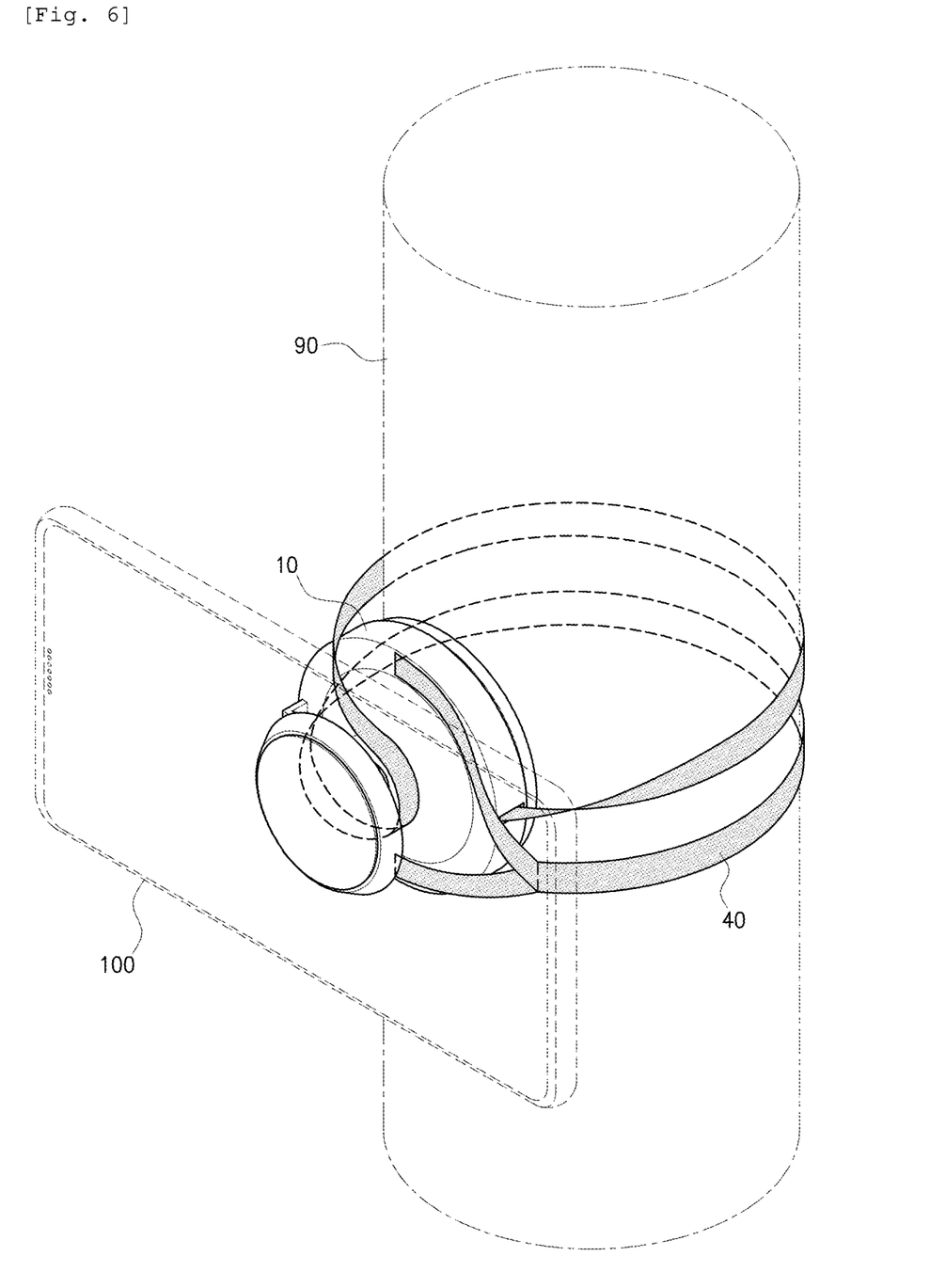
FIGS. 6 and 7 are perspective views showing methods for using the mobile phone fixing stand according to the present invention.
Figure 7:
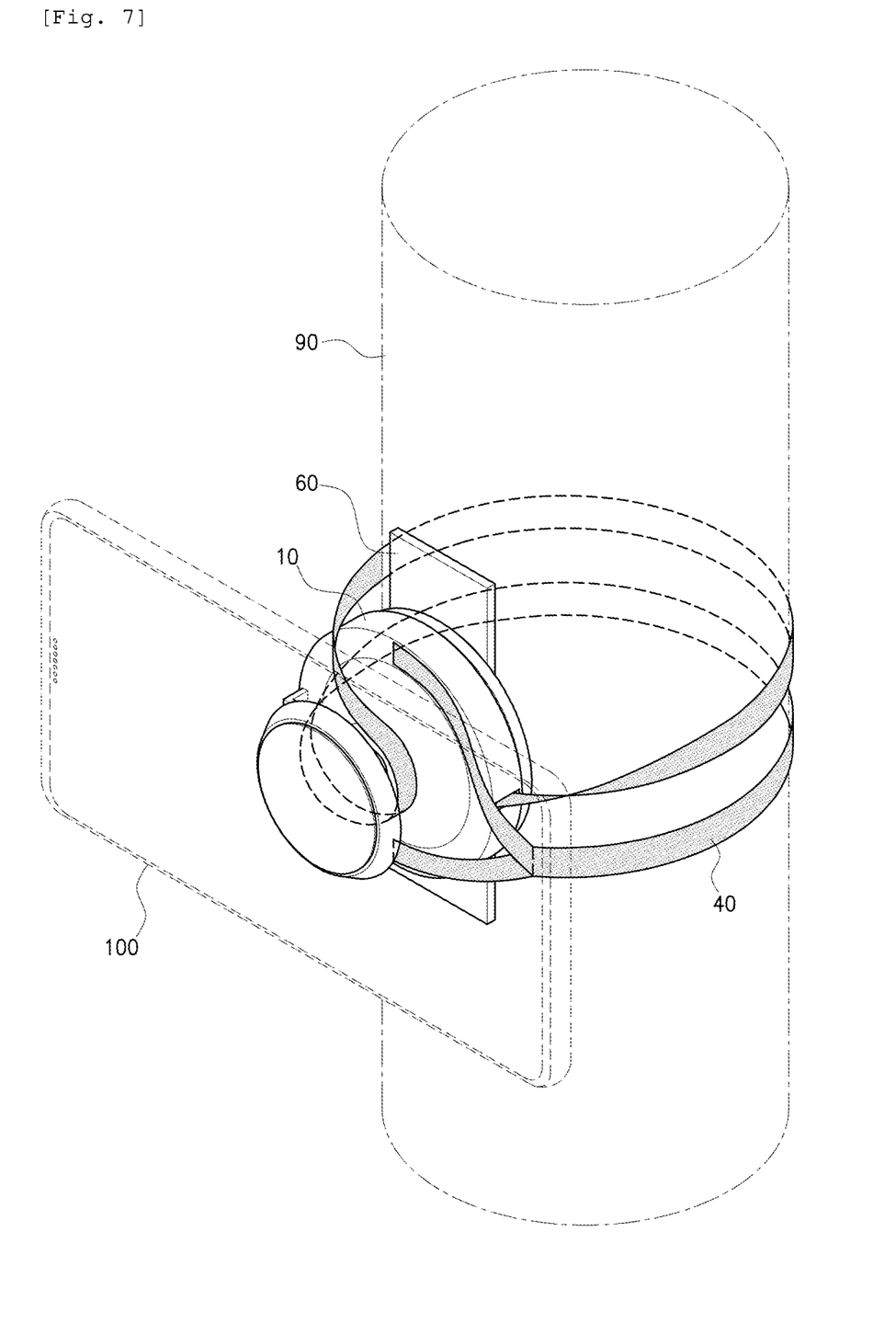
Figure 8:
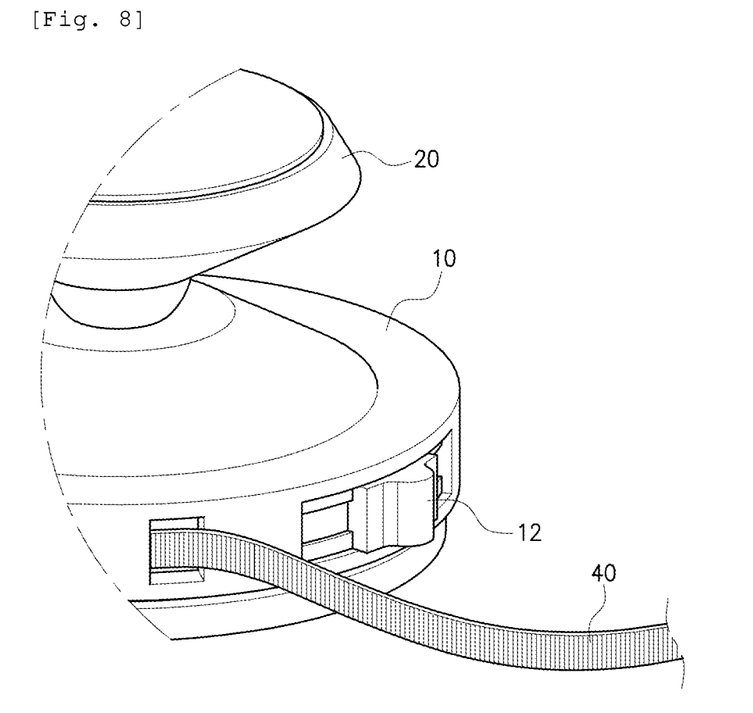
FIG. 8 is a partially perspective view showing a brake of the mobile phone fixing stand according to the present invention.
Figure 10:
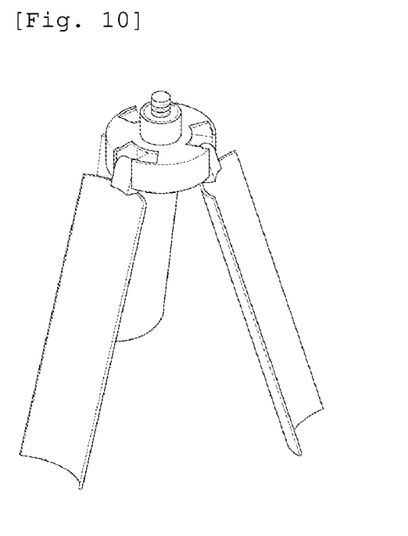
FIG. 10 is a perspective view showing a conventional tripod for a selfie stick.

FIG. 1 is a perspective view showing a mobile phone fixing stand according to an embodiment of the present invention, FIG. 2 is a side view showing the mobile phone fixing stand according to the present invention, FIG. 3 is a perspective view showing a mobile phone fixing stand according to another embodiment of the present invention, FIGS. 4a and 4b are top views showing a magnet(s) of the mobile phone fixing stand according to the present invention, FIG. 5 is a perspective view showing a groove of the mobile phone fixing stand according to the present invention, FIGS. 6 and 7 are perspective views showing methods for using the mobile phone fixing stand according to the present invention, FIG. 8 is a partially perspective view showing a brake of the mobile phone fixing stand according to the present invention, FIG. 9 is a perspective view showing a conventional selfie stick, and FIG. 10 is a perspective view showing a conventional tripod for a selfie stick.

The present invention is proposed to allow a mobile phone to be easily attached to a surrounding structure, without any use of the selfie stick held and stretched by a user's hand to thus take a selfie or any use of the selfie stick tripod standing on the ground to thus take a selfie, so that a selfie can be taken at various angles conveniently, and a mobile phone fixing stand for a selfie according to an embodiment of the present invention is shown in FIG. 1. As shown, the mobile phone fixing stand largely includes a body 10, a head 20, a mobile phone attachment plate 21, a fixing band 40, an upper fixing band 40-1, and a lower fixing band 40-2.

The body 10 has a spiral spring (not shown) mounted therein, and the fixing band 40 is connected to the end of the spiral spring. The force generated from the spiral spring is applied to the fixing band 40 to pull the fixing band 40 toward the inside of the body 10, so that the fixing band 40 is always rolledly drawn into the body 10. After the fixing band 40 has been pulled and fixed so as to use the mobile phone fixing stand, that is, if the fixing band 40 is released from the fixed state, it is pulled by means of the elastic force of the spiral spring and thus drawn into the body 10.

The fixing band 40 has one end connected to the spiral spring and serves to fixedly tie the mobile phone fixing stand of the present invention to a tree, a street lamp, or a given structure. As shown in FIG. 1, the fixing band 40 has a given width. Further, the fixing band 40 may be made of a non-elastic material, but desirably, it is made of a material having given elasticity. When the fixing band 40 is made of an elastic material, the objects of the present invention can be stably achieved.

As shown in FIG. 1, the upper fixing band 40-1 is made of the same material as the fixing band 40 and has one end fixed to the upper side of the front surface of the body 10 and another end connected to an end portion of the fixing band 40. Further, the lower fixing band 40-2 is made of the same material as the fixing band 40 and has one end fixed to the lower side of the front surface of the body 10 and another end connected to the end portion of the fixing band 40. As shown, that is, another end of the upper fixing band 40-1 and another end of the lower fixing band 40-2 are connected together to the end portion of the fixing band 40.

In this case, of course, the upper fixing band 40-1 and the lower fixing band 40-2 may be made of a different material from the fixing band 40. Further, the upper fixing band 40-1 and the lower fixing band 40-2 may be made of a non-elastic material.

Further, one end of the upper fixing band 40-1 and one end of the lower fixing band 40-2 are fixed to the upper and lower sides of the front surface of the body 10, respectively, by means of free fixing methods. For example, they may be fixed by means of adhesion to the body 10 or by means of insertion into the body 10. Otherwise, terminals (not shown) may be disposed on the upper and lower sides of the front surface of the body 10, respectively, and accordingly, one end of the upper fixing band 40-1 and one end of the lower fixing band 40-2 may be fastened to the terminals. The terminals may not be limited particularly to configurations, and only if they serve to fix the upper fixing band 40-1 and the lower fixing band 40-2 thereto, they may be freely configured. Each terminal may have the shape of a hanger 11 as will be discussed later, and otherwise, the terminals may be pressed against one end of the upper fixing band 40-1 and one end of the lower fixing band 40-2 and fixed thereto by means of fastening means such as screws, and the like.

As shown by one arrow of FIG. 1, the middle portion of the fixing band 40 having the above-mentioned configuration is pulled and hung on the hanger 11 disposed on the body 10. In this case, the hanger 11 protrudes from the body 10 on the opposite side to an entrance portion where the fixing band 40 is inserted and drawn into and from the body 10 and fixedly hangs the fixing band 40 thereon. The hanger 11 desirably has the shape of a hook bent to the shape of 'ㄱ' so as to reliably fasten the fixing band 40 thereto.

As shown by the other arrow of FIG. 1, the middle portion of the fixing band 40 is pulled to pass through the head 20 so that it is fixed to a ball joint as will be discussed later. Through such a method, as shown in FIG. 6, the mobile phone fixing stand of the present invention is fixedly disposed on a structure 90 such as a tree trunk, and the like.

As shown in FIG. 6, if it is desired to fix the mobile phone fixing stand of the present invention to the structure 90 by means of the fixing band 40, the upper fixing band 40-1 and the lower fixing band 40-2 are pulled in the state of being fixed to the upper and lower sides of the front surface of the body 10, and accordingly, the upper and lower sides of the body 10 can be fixed by means of the two bands, that is, the upper fixing band 40-1 and the lower fixing band 40-2. Besides, the fixed band 40 is wound doubly around the structure 90 and pulledly fixed to the structure 90.

Under the above-mentioned configuration, accordingly, the two bands each having the given width are pulledly fixed to the upper and lower sides of the body 10 and wound doubly around the structure 90, thereby providing a substantially stronger support force than a support force when a single band or wire is fixedly wound.

In specific, if it is desired to mount a mobile phone 100 on the head 20 of the body 10 so as to fix the mobile phone fixing stand of the present invention to the structure 90, in the state where the fixing band 40 does not have any upper fixing band 40-1 and lower fixing band 40-2, the end of the fixing band 40 inserted and drawn into and from the side of the body 10 is pulled so that the single fixing band 40 is fixedly wound around the structure 90. Accordingly, the fixing band 40 is fixed on the line passing through the central portion of the body 10, and since the mobile phone 100 mounted on the head 20 is located protrudingly forwardly from the body 10, the center of gravity of the body 10 moves forwardly to cause the body 10 to be slant forwardly and turned over due to the torque generated by the weight of the mobile phone 100, thereby failing to allow the body 10 to come into fixedly close contact with the structure 90. Therefore, it is difficult to stably and firmly support the body 10 against the structure 90 by means of a thin wire or a single band.

So as to prevent the body 10 from being turned over due to the torque generated by the weight of the mobile phone 100, the mobile phone fixing stand of the present invention is configured to allow the upper and lower sides of the body 10 to be fixedly wound by the upper fixing band 40-1 and the lower fixing band 40-2, and the structure 90 is wound doubly by the upper fixing band 40-1 and the lower fixing band 40-2.

Instead of the configuration where the fixing band 40 is hung on the hanger 11 protruding from the body 10, as shown in FIG. 3, a fastener 41 having the shape of a long bar is mounted freely movable on the end portion of the fixing band 40. In this case, the hanger 11 has the shape of a slot type concave groove whose inlet is small to allow the bar-shaped fastener 41 to be appropriately fastened thereto, so that the bar-shaped fastener 41 is slidingly fastened to the hanger 11. In this case, for example, the fastener 41 is a component used generally when a band type string of a backpack is tightened or loose, and therefore, an explanation of the fastener 41 will be avoided.

Even though not shown, further, the fastener 41 may have the shape of a loop-like ring, and instead of the slot type hanger 11, a ⊓-shaped loop type hanger 11 may be provided. Accordingly, the ring-shaped fastener 41 may be fixedly hung on the ⊓-shaped loop type hanger 11. In this case, the ring-shaped fastener 41 may be made of a non-elastic material such as a metal, plastic, and the like.

The structures of the fastener 41 and the hanger 11 as mentioned above are just exemplary, and without being limited thereto, accordingly, only if the fastener 41 is fixed to the body 10, free fixing methods such as a Velcro tape, a button, and the like may be adopted.

Further, as shown in FIG. 8, a brake 12 is disposed on one side of the body 10. The fixing band 40 is connected to the spiral spring disposed inside the body 10 and pulled toward the inside of the body 10, and in this case, the end portion of the fixing band 40 at which another end of the upper fixing band 40-1 and another end of the lower fixing band 40-2 are connected together is locked onto the side of the body 10 so that the fixing band 40 is not inserted anymore into the body 10.

If it is desired for a user to use the mobile phone fixing stand of the present invention, the fixing band 40 is pulledly hung on the hanger 11 or the ball joint so as to fix the mobile phone fixing stand to his or her desired structure. However, it is hard that the fixing band 40 is wound around the structure and then hung on the hanger 11due to the elastic force of the spiral spring. To solve such a problem, the fixing band 40 is pre-drawn by a given length from the body 10, and through the operation of the brake 12, it is fixed in position so that it cannot be rolledly inserted into the body 10.

The brake 12 is not particularly limited to kinds, and as shown in FIG. 8, a brake used for a tape measure may be adopted.

As shown in FIG. 2, the head 20 is connected to the body 10 by means of the ball joint so that it can freely rotate with respect to the body 10. The ball joint is configured to have a ball 50 fixed to the body 10 and inserted thereinto to allow only the head 20 to be rotatable with respect to the body 10. Even though not shown, the ball 50 may be fixed to the head 20 and inserted into the body 10, so that the ball 50 fixedly connected to the head 20 may rotate with respect to the body 10.

The head 20 is adapted to attach the mobile phone 100 thereto and thus has a mobile phone attachment plate 21 to which the mobile phone 100 is attached. The mobile phone attachment plate 21 is desirably made of a magnet and attached to the front surface of the head 20. Otherwise, of course, the mobile phone attachment plate 21 may be mounted inside the head 20.

In a state where a metal plate is attached to the underside of the mobile phone 100 or a mobile phone casing, if the metal plate is close to the head 20 to which the mobile phone attachment plate 21 is attached, the mobile phone 100 is attached to the head 20 by means of the magnetic force generated between the metal plate and the mobile phone attachment plate 21.

Through the operation of the ball joint, next, the mobile phone 100 is easily controlled to the user's desired angle, while moving by his or her hand.

Further, a magnet 31 is disposed on the underside of the body 10 so as to allow the mobile phone fixing stand of the present invention to be easily attached to the structure 90 to which the magnet is attachable. In this case, the mobile phone fixing stand of the present invention can be fixed to the structure 90 only by means of the magnetic force, without having any fixing band 40, so that it can be very easily and conveniently used. In the case where there is no structure to which the magnet is attachable, for example, during hiking, the mobile phone fixing stand is fixedly attached to the structure 90 through the fixing band 40.

The magnet 31 is not particularly limited to kinds, and various magnets such as a neodymium magnet, and the like may be adopted as the magnet 31.

The magnet 31 is mounted on the underside of the body 10, and as shown in FIGS. 4a and 4b, of course, a fixing plate 30 is additionally disposed on the underside of the body 10 so that the magnet 31 is mounted on the fixing plate 30.

FIGS. 4a and 4b show examples where the magnet(s) 31 is (are) mounted on the fixing plate 30. In specific, FIG. 4a shows a plurality of magnets 31 disposed along the edge periphery of the fixing plate 30, and FIG. 4b shows a ring-shaped magnet 31 disposed concentrically with the fixing plate 30 along the edge periphery of the fixing plate 30.

The magnet(s) 31 is (are) disposed on the fixing plate 30, as shown in FIGS. 4a and 4b, and of course, the magnet(s) 31 may be disposed directly on the underside of the body 10, in the same way as shown in FIGS. 4a and 4b.

Further, as shown in FIGS. 4a and 4b, one of the technical characteristics of the present invention is to avoid the magnet(s) 31 from being disposed on the central portion of the body 10 or the fixing plate 30. The spiral spring is located inside the body 10. In this case, the spiral spring is disposed on the central portion of the body 10, and accordingly, if the magnet(s) 31 is (are) disposed on the central portion of the body 10 or the fixing plate 30, the spiral spring made of the metal may not operate well because of the magnetic force of the magnet(s) 31. Accordingly, the magnet (s) 31 should be disposed along the edge periphery of the body 10 or the fixing plate 30, not on the central portion thereof, so as to operate the spiral spring well.

Further, as shown in FIG. 5, a concave groove 32 is formed on the underside of the fixing plate 30. The formation of the concave groove 32 is to enhance a tight contact force with the structure 90 when the mobile phone fixing stand of the present invention is mounted on the structure 90, as shown in FIG. 6, thereby achieving firm mounting on the structure 90.

Further, as shown in FIG. 7, if the mobile phone fixing stand of the present invention is fixed to the structure 90 such as a tree trunk, and the like, the mobile phone 100 whose size is big or weight is large because of accessories attached thereto may be inclined forward even in a state of being fixed to the structure 90. To solve such a problem, a support plate 60 is additionally disposed on the underside of the body 10. The support plate 60 is a structure for preventing the mobile phone 100 from being inclined downward due to the weight of the mobile phone 100, and as shown, the support plate 60 desirably extends up and down. Besides, even though not shown, a support plate 60 extending from left to right may be disposed on the underside of the body 10 to allow the mobile phone fixing stand of the present invention to be fixed to the structure 90 extending from left to right. Accordingly, of course, a +-shaped support plate 60 may be provided.

The support plate 60 is desirably made of a material attached well to the magnet and having high strength so that it is detachably mounted on the body 60. However, of course, the support plate 60 may be provided integrally with the body 10.

Further, rubber pads or silicone pads may be attached to the undersides of the body 10, the fixing plate 30, and the support plate 60, respectively, so as to prevent sliding.

In addition, as shown in FIG. 9, a gripping member 300 for fixedly holding the mobile phone 100 is attached to the head 20. In this case, a metal plate is attached to the underside of the gripping member 300, and if the metal plate of the gripping member 300 is close to the head 20 to which the mobile phone attachment plate 21 is attached, the gripping member 300 is attached to the head 20 by means of a magnet force generated therebetween. The gripping member 300 is widely used for a selfie stick, and therefore, a detailed explanation of the gripping member 300 will be avoided.

According to the present invention, so as to take a selfie in a daily life or during leisure activity, the mobile phone 100 can be easily attached to the mobile phone fixing stand by means of the magnetic force, and the mobile phone fixing stand of the present invention can be simply attached to the surrounding structure 90 by means of the magnetic force, so that the selfie can be taken by a remote controller or gesture shot at a remote distance. Of course, in the case of the structure 90 to which the magnet is not attached, the mobile phone fixing stand can be attached to the structure 90 by means of the fixing band 40. Further, the upper fixing band 40-1 and the lower fixing band 40-2 fix the upper and lower sides of the mobile phone fixing stand of the present invention, respectively, and the fixing band 40 is wound doubly around the structure 90 to fix the structure 90 thereto, so that the mobile phone fixing stand of the present invention can be prevented from being inclined forward and turned over because of the weight of the mobile phone.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:
1. A mobile phone fixing stand for a selfie, comprising:
a body having a spiral spring mounted therein, wherein the body has a hanger disposed on an opposite side to a portion where a fixing band is inserted and drawn so as to hang the fixing band thereon;
a head connected to a front surface of the body by a ball joint and freely rotatable with respect to the body;
a mobile phone attachment plate disposed on the head and made of a magnet to which a mobile phone is fixedly attached, wherein the mobile phone attachment plate has a gripping member mounted thereon to fixedly hold opposite ends of the mobile phone;
the fixing band with a given width connected to the spiral spring, inserted into and drawn from the inside of the body on a given side surface of the body and made of an elastic material, wherein the fixing band has a fastener having the shape of a long bar and mounted freely movable on an end portion of the fixing band, so that the fastener is insertedly mounted into the hanger having a shape of a slot type concave groove;
an upper fixing band with a given width fixed to an upper side of the front surface of the body on one end thereof and connected to the end portion of the fixing band on another end thereof; and
a lower fixing band with a given width fixed to a lower side of the front surface of the body on one end thereof and connected to the end portion of the fixing band on another end thereof,
wherein an arbitrary portion of the fixing band is pulled and fixedly wound around a structure to which the body is fixed, and wherein the upper fixing band and the lower fixing band supportingly pull the upper side and the lower side of the body, respectively, so that the body is fixed to the structure to hold the mobile phone to take the selfie.

2. The mobile phone fixing stand for a selfie according to claim 1, wherein the body has one or more magnets disposed along an edge periphery thereof on a region excepting a central portion thereof, the magnets being disposed in parallel with one another along the edge periphery of the body, or the one or more magnets having the shape of a ring concentric with the edge periphery of the body being disposed along the edge periphery of the body, and otherwise, the body has a fixing plate disposed on and underside thereof to allow one or more magnets to be disposed along an edge periphery of the fixing plate on the region excepting the central portion of the fixing plate, the magnets being disposed in parallel with one another along the edge periphery of the fixing plate, or the magnet having the shape of a ring concentric with the edge periphery of the fixing plate being disposed along the edge periphery of the fixing plate.

3. The mobile phone fixing stand for a selfie according to claim 2, wherein the body or the fixing plate has a concave groove formed on the underside thereof.

4. The mobile phone fixing stand for a selfie according to claim 1, wherein the body has a concave groove formed on an underside thereof.

\* \* \* \* \*